US009481206B2

(12) United States Patent
Block et al.

(10) Patent No.: US 9,481,206 B2
(45) Date of Patent: Nov. 1, 2016

(54) ROLLER

(75) Inventors: Wolfgang Block, Wermelskirchen (DE); Uwe Harksen, Wermelskirchen (DE)

(73) Assignee: TENTE GmbH & Co. KG, Wermelskirchen (DE)

( * ) Notice: Subject to any disclaimer, the term of this patent is extended or adjusted under 35 U.S.C. 154(b) by 0 days.

(21) Appl. No.: 13/883,392

(22) PCT Filed: Nov. 8, 2011

(86) PCT No.: PCT/EP2011/069607
§ 371 (c)(1),
(2), (4) Date: May 3, 2013

(87) PCT Pub. No.: WO2012/065877
PCT Pub. Date: May 24, 2012

(65) Prior Publication Data
US 2013/0227817 A1    Sep. 5, 2013

(30) Foreign Application Priority Data

Nov. 15, 2010 (DE) .......................... 10 2010 060 549

(51) Int. Cl.
*B60B 33/00* (2006.01)
*B60B 33/02* (2006.01)

(52) U.S. Cl.
CPC .......... *B60B 33/02* (2013.01); *B60B 33/0021* (2013.01); *B60B 33/0039* (2013.01); *B60B 33/0049* (2013.01); *B60B 33/0057* (2013.01);
(Continued)

(58) Field of Classification Search
CPC ... B60B 33/02; B60B 33/00; B60B 33/0002; B60B 33/021

USPC .... 16/35 R, 35 D, 39, 31 R, 18 CG; 188/19, 188/20, 29, 30, 31, 1.11 R, 1.12
See application file for complete search history.

(56) References Cited

U.S. PATENT DOCUMENTS 1,222,414 A * 4/1917 Klinsmann ........................ 16/21
1,456,395 A * 5/1923 Moll et al. ...................... 43/109
(Continued)

FOREIGN PATENT DOCUMENTS

DE    24 59 580    6/1976
DE    32 43 211    5/1984
(Continued)

OTHER PUBLICATIONS

International Search Report of PCT/EP2011/069607, date of mailing Jan. 30, 2012.

*Primary Examiner* — David E Sosnowski
*Assistant Examiner* — Jason W San
(74) *Attorney, Agent, or Firm* — Collard & Roe, P.C.

(57) ABSTRACT

The invention relates to a roller (1) having a wheel (2), which is accommodated in a housing, and a locking device (10, 17), the locking device (10, 17) being actuated by foot actuation of an actuating element (5) which is arranged so that it extends radially outwardly with respect to a vertical (V) that passes through a securing portion of the roller (1). To provide a roller which is advantageously formed with regard to locking by foot operation, it is proposed that an actuating portion of the actuating element (5) extends circumferentially at least far enough that a second foot actuation in the circumferential direction with respect to the vertical (V) may be carried out next to an area of the actuating portion by way of which a first foot actuation has been carried out.

7 Claims, 14 Drawing Sheets

(52) U.S. Cl.
CPC ....... *B60B 33/0068* (2013.01); *B60B 33/0073* (2013.01); *B60B 33/0081* (2013.01); *B60B 33/021* (2013.01); *B60B 33/025* (2013.01); *Y10T 16/195* (2015.01)

(56) References Cited

U.S. PATENT DOCUMENTS

| | | | | |
|---|---|---|---|---|
| 1,497,966 | A * | 6/1924 | Wiley | 43/109 |
| 1,563,152 | A * | 11/1925 | Bowen | 16/41 |
| 1,595,582 | A * | 8/1926 | Stedman | 248/345.1 |
| 1,665,882 | A * | 4/1928 | Jarvis et al. | 16/18 CG |
| 1,888,726 | A * | 11/1932 | Jarvis et al. | 16/18 CG |
| 1,906,590 | A * | 5/1933 | Hewson | 248/345.1 |
| 2,059,348 | A * | 11/1936 | Herold | 16/18 CG |
| 2,290,001 | A * | 7/1942 | Sherman | 248/345.1 |
| 2,345,442 | A * | 3/1944 | Winter et al. | 16/35 R |
| 2,650,100 | A * | 8/1953 | Ronning | 280/103 |
| 2,659,100 | A * | 11/1953 | Cramer | 16/22 |
| 2,748,418 | A * | 6/1956 | Armour | 16/18 CG |
| 2,885,821 | A * | 5/1959 | Frick | 248/345.1 |
| 2,981,969 | A * | 5/1961 | Fontana | 16/18 CG |
| 3,532,188 | A * | 10/1970 | Kelz | 188/21 |
| 3,890,669 | A * | 6/1975 | Reinhards | 16/35 R |
| 4,035,864 | A * | 7/1977 | Schroder | 16/35 R |
| 4,349,937 | A * | 9/1982 | Fontana | 16/35 R |
| 4,722,114 | A * | 2/1988 | Neumann | 16/35 R |
| 4,815,161 | A * | 3/1989 | Timmer et al. | 16/35 R |
| 4,941,552 | A * | 7/1990 | Screen | 188/1.12 |
| 4,985,960 | A * | 1/1991 | Zun | 16/35 R |
| 5,103,530 | A * | 4/1992 | Andrisin et al. | 16/20 |
| RE34,433 | E * | 11/1993 | Heiligenthal et al. | 188/19 |
| 5,303,450 | A * | 4/1994 | Lange | 16/35 D |
| 5,774,936 | A * | 7/1998 | Vetter | 16/35 R |
| 5,964,335 | A * | 10/1999 | Taniguchi et al. | 192/219.5 |
| 6,336,524 | B1 * | 1/2002 | Van Loon et al. | 188/1.12 |
| 6,419,053 | B1 * | 7/2002 | Martin-Vegue et al. | 188/19 |
| 6,598,712 | B1 * | 7/2003 | Sun | 188/20 |
| 6,810,560 | B1 * | 11/2004 | Tsai | 16/35 R |
| 6,854,567 | B2 * | 2/2005 | Suzuki | 188/1.12 |
| 7,182,178 | B2 * | 2/2007 | Chung | 188/1.12 |
| 7,506,404 | B2 * | 3/2009 | Block et al. | 16/18 R |
| 7,546,908 | B2 * | 6/2009 | Chang | 188/1.12 |
| 7,698,780 | B2 * | 4/2010 | Yan | 16/35 R |
| 7,735,619 | B2 * | 6/2010 | Kato et al. | 192/219.5 |
| 7,757,832 | B2 * | 7/2010 | Sauter et al. | 192/219.5 |
| 7,810,613 | B2 * | 10/2010 | Lin | 188/1.12 |
| 7,926,145 | B2 * | 4/2011 | Liao | 16/35 R |
| 8,037,972 | B2 * | 10/2011 | Fujita | 188/31 |
| 8,079,606 | B2 * | 12/2011 | Dull et al. | 280/47.39 |
| 8,122,535 | B2 * | 2/2012 | Hensley et al. | 5/86.1 |
| 8,181,310 | B2 * | 5/2012 | Schulte | 16/35 R |
| 8,205,297 | B2 * | 6/2012 | Fallshaw et al. | 16/35 R |
| 8,220,110 | B1 * | 7/2012 | Chen | 16/35 R |
| 8,302,257 | B2 * | 11/2012 | Lin | 16/35 R |
| 8,365,354 | B1 * | 2/2013 | Fan | 16/35 R |
| 8,464,843 | B2 * | 6/2013 | Qiu et al. | 188/1.12 |
| 8,544,355 | B2 * | 10/2013 | Burgardt et al. | 74/411.5 |
| 8,596,421 | B2 * | 12/2013 | Park | 188/19 |
| 2005/0194218 | A1 * | 9/2005 | D'Arca | 188/19 |
| 2006/0102435 | A1 * | 5/2006 | Chiang | 188/19 |
| 2006/0151259 | A1 * | 7/2006 | Tomasi et al. | 188/31 |
| 2009/0019670 | A1 * | 1/2009 | Tsai | 16/35 R |
| 2009/0139805 | A1 * | 6/2009 | Santamaria | 188/20 |
| 2009/0276977 | A1 * | 11/2009 | Liao | 16/35 R |
| 2011/0083298 | A1 * | 4/2011 | Yan | 16/31 R |
| 2012/0255141 | A1 * | 10/2012 | Lin et al. | 16/45 |
| 2013/0112509 | A1 * | 5/2013 | Henry | 188/20 |
| 2013/0180805 | A1 * | 7/2013 | Cheng | 188/20 |
| 2013/0227817 | A1 * | 9/2013 | Block et al. | 16/35 R |
| 2013/0248302 | A1 * | 9/2013 | Zhang | 188/20 |

FOREIGN PATENT DOCUMENTS

| | | |
|---|---|---|
| DE | 39 17 291 | 2/1990 |
| EP | 0105144 B1 * | 11/1984 |
| EP | 0259131 B1 * | 9/1988 |
| EP | 354827 A1 * | 2/1990 |
| WO | WO 9609937 A1 * | 4/1996 |
| WO | WO 2006008198 A1 * | 1/2006 |
| WO | WO 2008/148169 | 12/2008 |
| WO | WO 2008148169 A1 * | 12/2008 |
| WO | WO 2013026744 A1 * | 2/2013 |

* cited by examiner

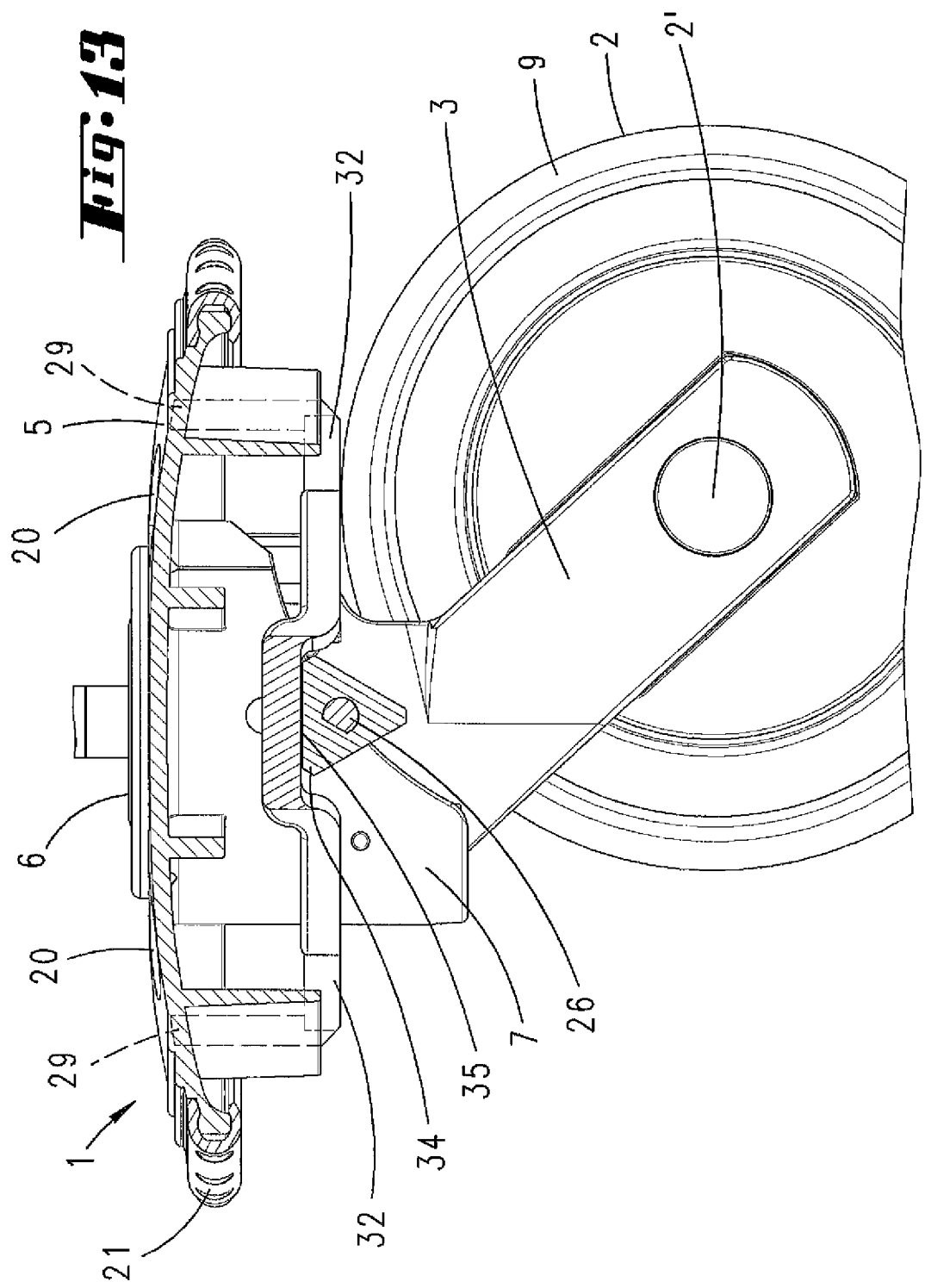

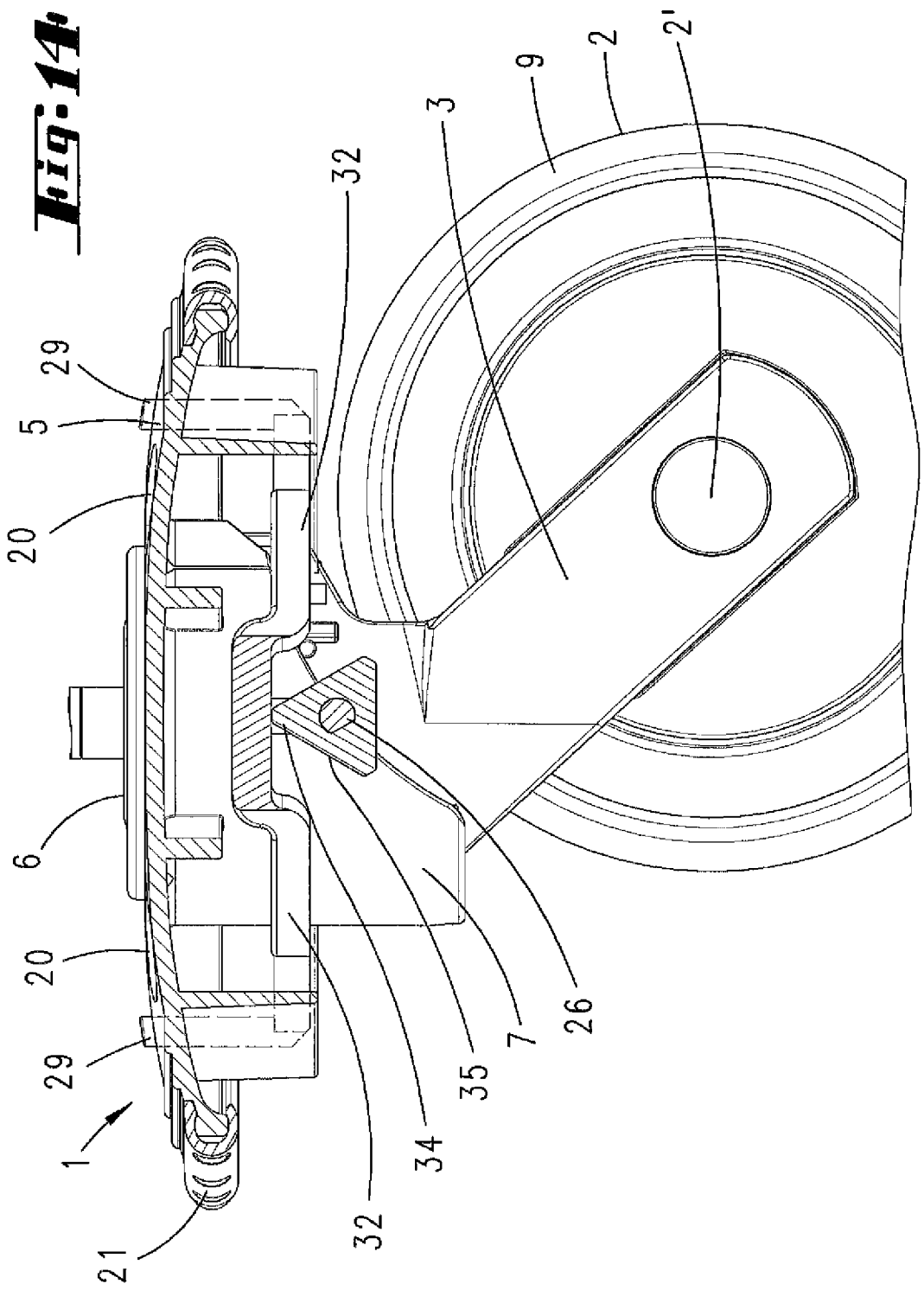

ROLLER

CROSS REFERENCE TO RELATED APPLICATIONS

This application is the National Stage of PCT/EP2011/069607 filed on Nov. 8, 2011, which claims priority under 35 U.S.C. §119 of German Application No. 10 2010 060 549.2 filed on Nov. 15, 2010, the disclosure of which is incorporated by reference. The international application under PCT article 21(2) was not published in English.

The invention relates to a roller having a wheel, which is accommodated in a housing, and a locking device mounted on the housing, the locking device being actuated by foot actuation of an actuating element which is arranged so that it extends radially outwardly with respect to a vertical that passes through a securing portion of the roller.

These types of rollers, configured as guide rollers, for example, are known in a variety of embodiments. Reference is made to DE 24 59 580 A1 and DE 39 17 291 C2, for example. Although the foot actuation of these rollers provided with an actuating element on the roller itself is generally regarded as satisfactory, an option for further improving the convenience of the actuation is still sought.

In the case of a roller known from WO2008/148169 A1, a U-shaped activator is provided, which extends over the width of the two wheels of the roller that are arranged secured together as a double roller. DE 32 43 211 A1 describes a conventional roller with an actuating part that projects forward in the direction of extent of the wheel.

Based on the last-cited prior art, it is an object of the invention to provide a roller having an advantageous design with regard to locking via foot operation.

This object is achieved by the subject matter of claim 1, which provides that an actuating portion of the actuating element extends circumferentially at least far enough that a second foot actuation in the circumferential direction with respect to the vertical may be carried out next to an area of the actuating portion by way of which a first foot actuation has been carried out, which actuating portion also allows actuation of the locking device of the roller without the foot necessarily having to be placed overlying the wheel on the actuating portion of the actuating element.

According to the invention, an actuating element having an actuating portion extending widely in the circumferential direction is provided. The actuating portion is also preferably provided with such an extent in the circumferential direction, that a third or further foot actuation is possible without reusing the area of the prior foot actuations. This opens the possibility, in particular in a guide roller, to carry out an actuation by way of a certain area up to the entire area, regardless of the angular orientation of the wheel. The advantages are also realized with a fixed caster. If, for example, a device having the fixed caster is situated directly against a wall, it is still possible to carry out a foot actuation from the side, for example. The area of a foot actuation may be, for example, a portion of the wheel width, starting at approximately one-third of the wheel width, to a dimension corresponding to the wheel width or up to 1.5 times the wheel width. In this regard, a wheel width is assumed to be a dimension between 3 and 10 cm, for example, such a dimension preferably being used when the actual wheel width is to be less than the mentioned lower limit. The actuating element preferably extends by at least one wheel width, in the circumferential direction with respect to the vertical, beyond the wheel or its imaginary extension.

If the actual wheel width is within the above-mentioned dimensional range, in this respect the above-mentioned range or an individual value therefrom may also be used. Customarily, at least one actuating portion of the actuating element extends overlying the wheel, or, with respect to the vertical, overlying an imaginary extension of the wheel in the radial direction, i.e., protruding in front of or behind the wheel, for example. The mentioned approach widens this actuating portion basically in the circumferential direction.

The locking device may be a braking lock and/or a directional lock, for example.

Further features of the invention are described and illustrated below, also in the description of the figures and in the drawings, often in their preferred association with the concepts explained above, but may also be of importance in an association with only one or more individual features which are described herein or illustrated in the drawings, or independently or in some other overall concept.

It is preferred that the actuating portion is circumferentially provided over a quarter circle or more. The actuating portion is preferably circumferentially provided in closed form, particularly preferably over a full circle. The actuating portion may in particular be formed as a rotationally symmetrical body. The circumferential actuating portion allows the locking device to be largely or completely actuated, regardless of the orientation of the roller. With respect to the circumferential extent, a characterization with respect to a circumferential angle may also be indicated. In this regard, the actuating portion preferably extends over a circumferential angle of 20° or more, up to 360°, relative to its radially outermost portion.

It is further preferred that the actuating element moves vertically as a whole during an actuation. For this purpose, for example a central pin or cup (the latter open at the bottom, for example) may be provided, around which the actuating element extends, at least over a part of the circumference. At the same time, the pin or cup then preferably provides a central guide for the vertical movement.

In addition, an action part which acts on the wheel, in particular a running surface of the wheel, is preferably provided, at least to achieve a braking lock. For the directional lock, a detent element, for example a toothed detent element, which is known per se, may be provided as a locking device, for interaction with a counter-detent part which is stationary relative to the rotatable part of the roller.

The action element is acted on by the actuating element, for example by way of a wedge pair. The actuating element may have a wedge-shaped cross-section which is deflected by a plunger that is formed on the actuating element and moves vertically during movement of the actuating element, and is thus displaced from an unengaged position into an engaged position with respect to the wheel. The wedge pair may particularly preferably be provided in such a way that self-locking results in the fixed state. The backward movement of the actuating element may then be achieved, for example, by raising the actuating element—with regard to foot actuation, by reaching under the actuating element with the toe, for example.

Another option for the interaction with the action element is possible via an action cam. The vertically displaceable action cam pushes the action part into its engaged position, and locking in the engaged position occurs.

In this regard, it is particularly preferred that the actuating element acts on the action element in two successive actuations with different action cams. This measure allows a subsequent movement involving a plurality of action cams to be carried out instead of a back-and-forth movement involving one action cam. In this regard, it is also preferred that the action cam is part of a cam wheel having a plurality of action cams. For the actuation, the cam wheel may then be rotated, a free space being provided between two action cams which allows the action part to move back into a released position. For this purpose, the action part may, for example, be spring-biased into its released position.

It is further preferred that one or more indicators is/are provided which indicate(s) a braking lock to the user. The indicators may be formed as stationary rod portions which preferably extend vertically or at least substantially vertically, at least with regard to their portion used as an indication. When the action element is pushed downwardly, the tips of the rod parts correspondingly protrude upwardly. However, the indicators may also be actuated via a shaft, in particular a shaft on which the mentioned action cams are also situated. The indicators are then actively extended upwardly with respect to the action element in the course of the actuation. In this embodiment, for the visibility of an indicator, it is not important whether the actuating element is in its raised or lowered position. After actuation, i.e., shifting of the action element into the braked position or into the released position, the actuating element may in each case be moved back into its starting position—thus, in the braked state, into its starting position, with the indicators nevertheless protruding, for example upwardly. Upon a next actuation, the indicators are then again moved downwardly by the shaft, so that in the released position, in which the action part is then preferably also at its starting height, the indicators do not protrude upwardly. The indicators may also be formed in such a way that they are provided in the form of pointer elements together with the shaft. Depending on the rotational position of the shaft, the indicators may then protrude outwardly beyond a cover which otherwise covers the other pointers.

A further implementation of the indicator function may be that the function position is externally indicated by means of a positive-fit pointer element via the shaft, depending on the degree of the rotational position.

The numerical ranges or ratio ranges stated above and hereinafter, provided that they are not already stated anyway by way of example, also include all values in between, in particular in one-tenth increments of the particular dimension, or if applicable, also for the case of dimensionless values, for example $1/10°$, etc., for delimiting the mentioned range limits from below and/or above, but alternatively or additionally, also with regard to the disclosure of one or more single values from the particular range.

The invention is explained in greater detail below with reference to the appended drawings, which, however, merely represent exemplary embodiments. The drawings show the following:

FIG. 13 shows an illustration of the roller according to FIG. 6 in the region of the indicator actuation, in the released position; and FIG. 14 shows an illustration corresponding to FIG. 13, in the actuating position according to FIG. 7.

In first instance, a roller 1 in a first embodiment is illustrated and described with reference to FIGS. 1 to 5.

Figure 5:
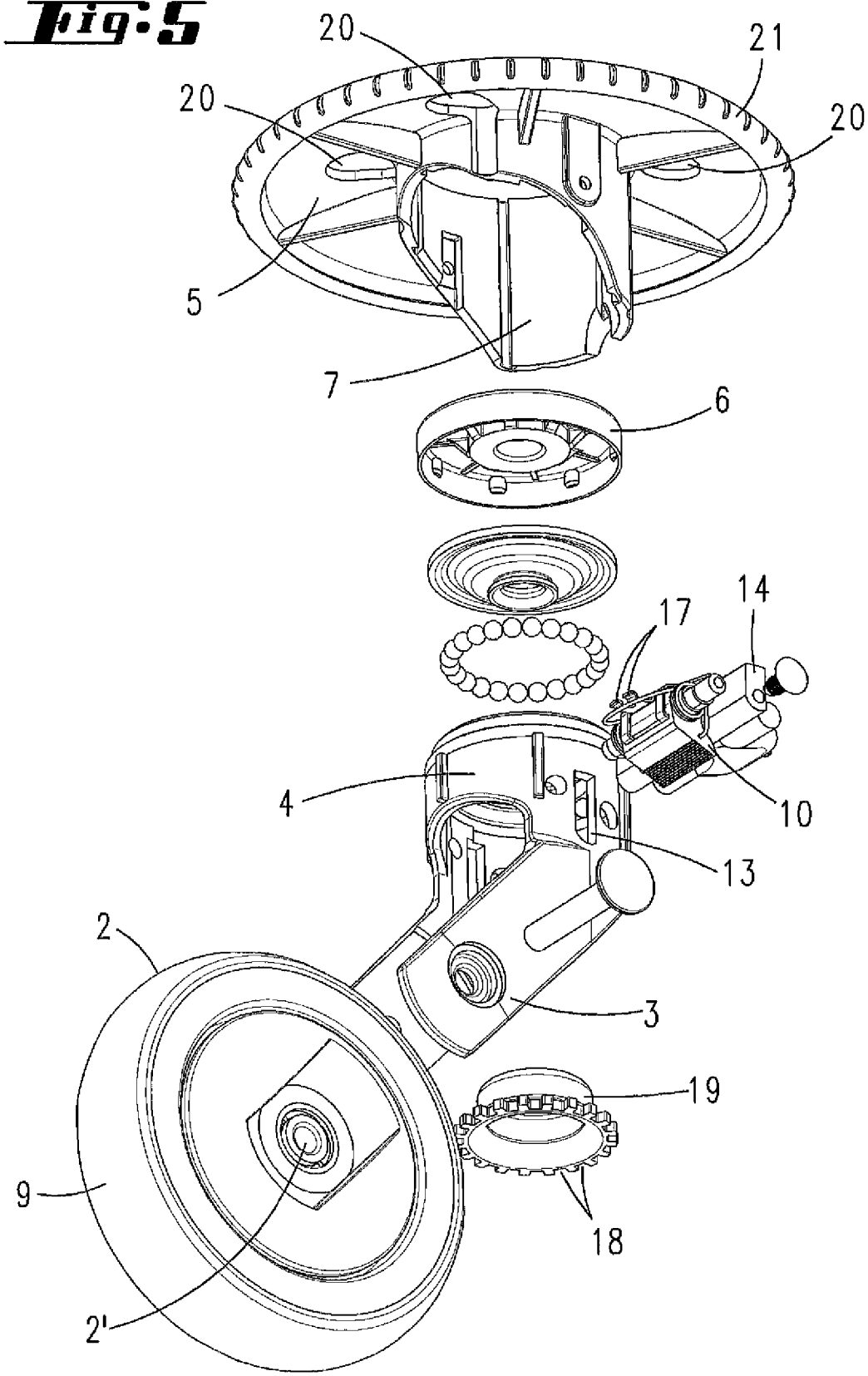
FIG. 5 shows an exploded illustration of the roller in a first embodiment.
Figure 6:
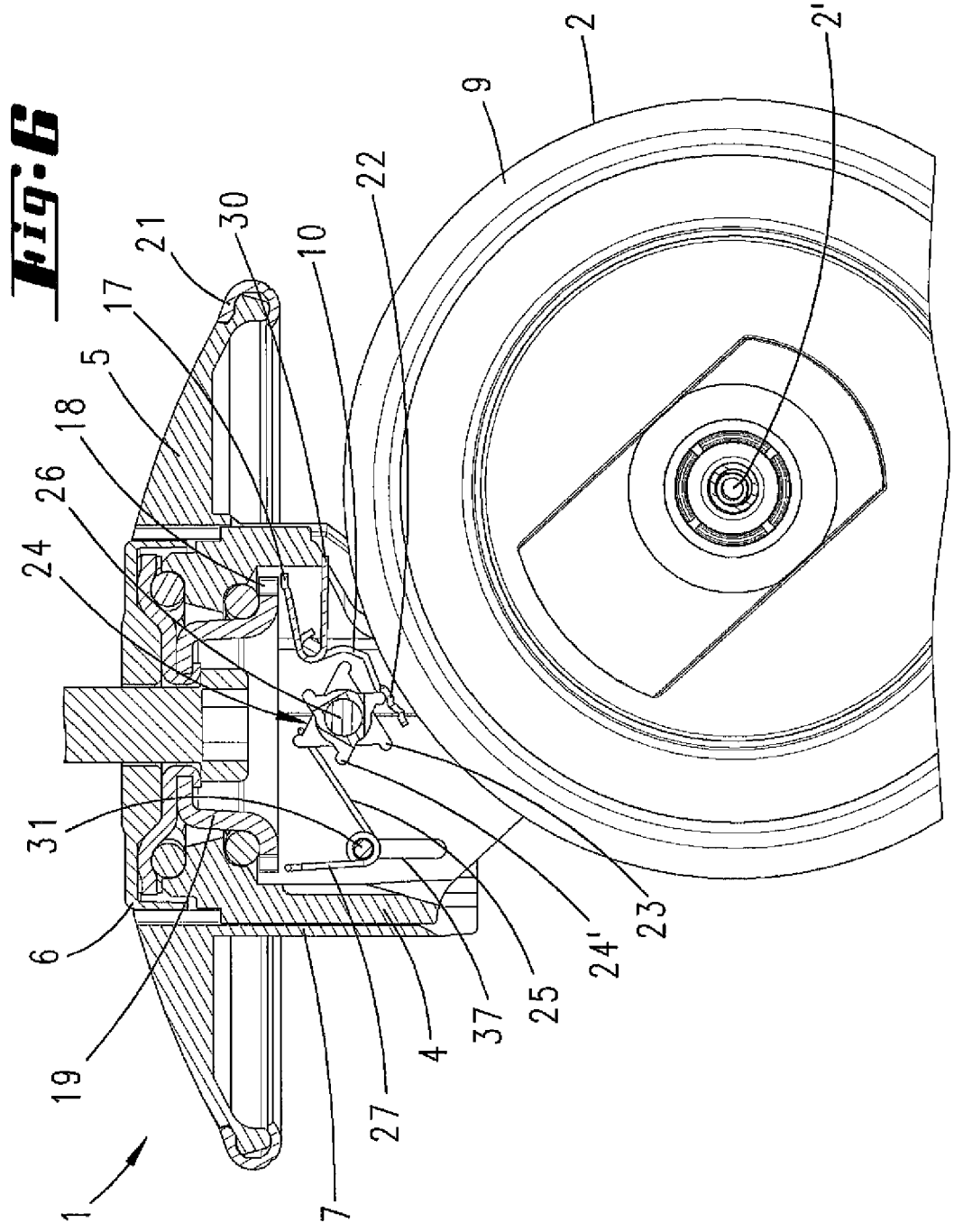
FIG. 6 shows a cross-section of a roller in a second embodiment, with the action part in the released position.

The roller 1 has a wheel 2 that is accommodated in a fork 3 (also see FIG. 5). The fork 3 merges into a cup-like vertical portion 4 which, as is apparent, extends vertically and laterally offset with respect to a wheel axle 2'. This vertical portion 4 together with the fork 3 forms a housing of the roller 1, in which the wheel 2 is accommodated.

The vertical portion 4 also represents a guide for an actuating element 5 which is arranged and formed so as to extend radially outwardly with respect to a vertical, V, passing through a securing portion 6 of the roller 1. In the exemplary embodiment, the actuating element 5 is formed as an annular disk-like body having a downwardly protruding cylindrical projection 7, which in the present case is preferably on a portion of the circumference. The actuating element 5 is guided on an outer surface of the vertical portion 4.

Figure 3:
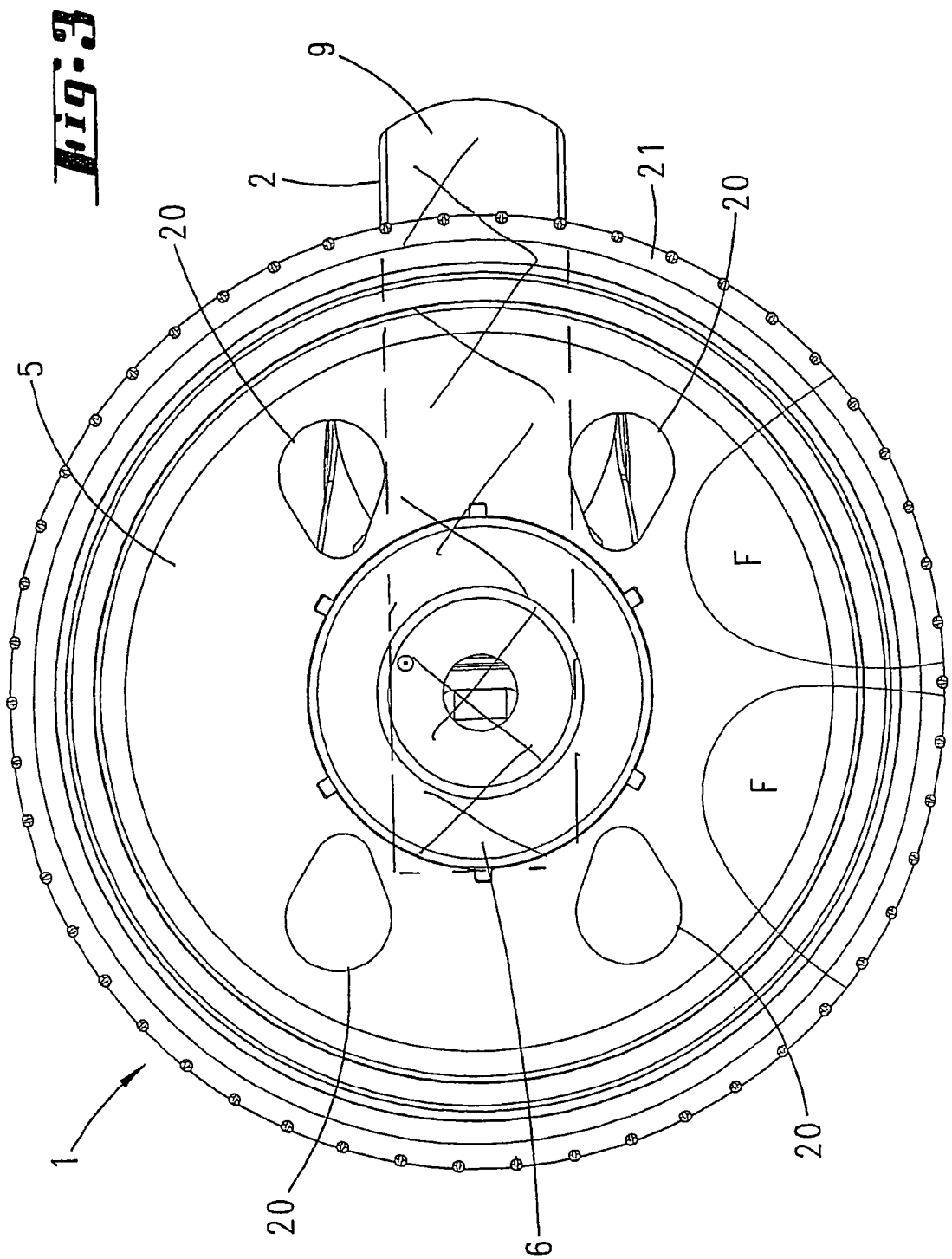
FIG. 3 shows a top view of the roller according to FIG. 1.

As a result of the actuating element 5 being formed as an annular body, as is also apparent in particular from FIG. 3, the fixed position in the roller 1 may be actuated in any radial direction with respect to the securing portion 6. The actuation is carried out by a foot action.

The entire surface of the actuating element 5 may be used as the actuating portion. In FIG. 3, the multiplicity of possible adjacent foot actuations over the periphery is illustrated by foot (shoe) plan views F. It is practical to carry out the actuation only with a front foot (shoe) area. In the exemplary embodiments described here, the surface of the actuating element 5 in each case forms a circumferential area on the actuating portion.

Figure 1:
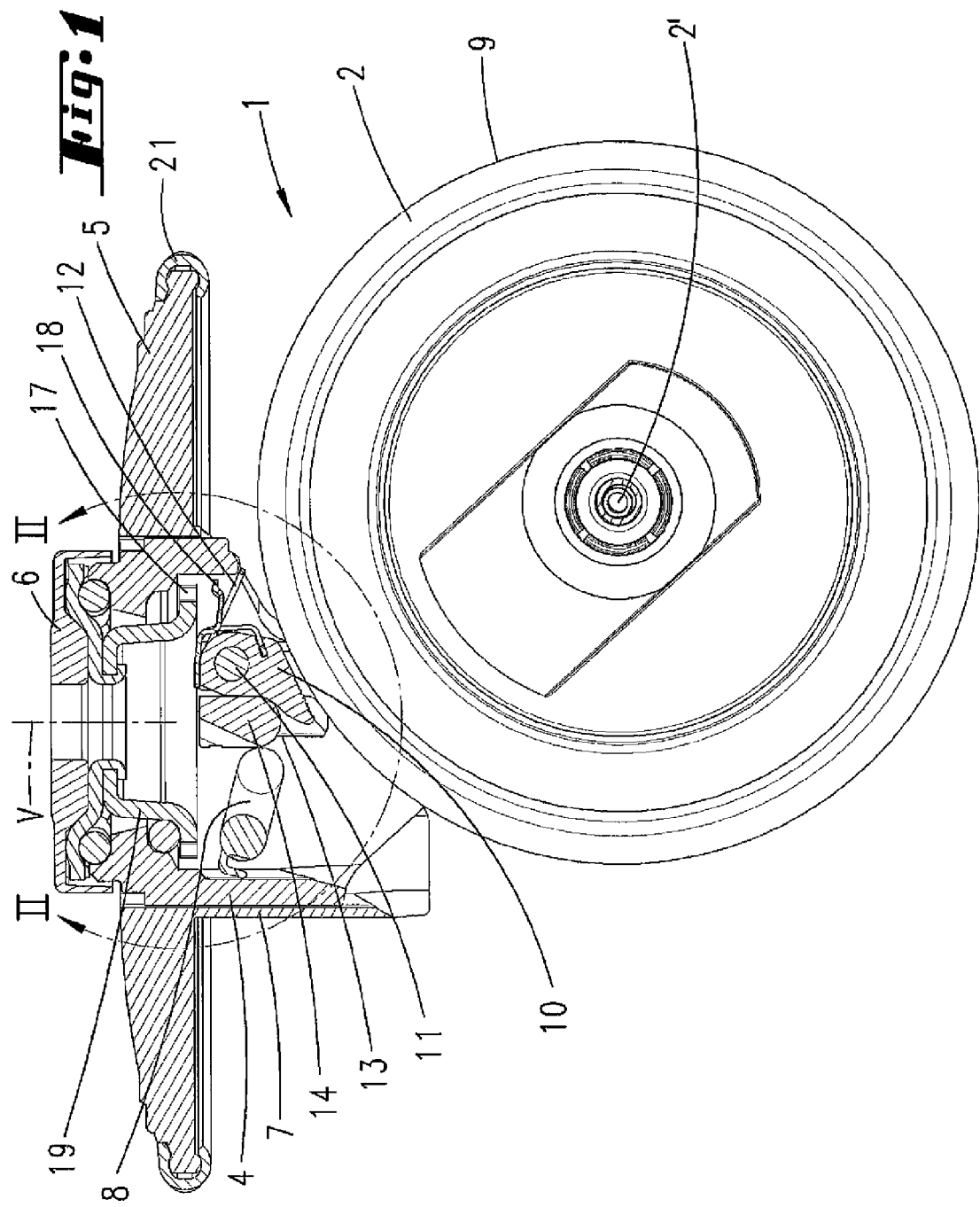
FIG. 1 shows a cross-section of a roller in a first embodiment, in the nonactuated state.

In addition, an action part 10 which acts on a running surface 9 of the wheel 2 is provided as a first locking device. In the exemplary embodiment, the action part 10 is a brake part. This action part 10 is secured by means of a pin 11 in the vertical portion 4 so as to be rotatable about the pin 11, which extends horizontally. Spring-biasing into the nonactuated position illustrated in FIG. 1 is provided by means of a spring part 12 (also see FIG. 4).

In the vertical portion 4, a pusher 14 is provided on the actuating element 5, preferably connected to the wall 7 thereof; with passage through a corresponding vertical elongated hole 13 (see FIG. 5, for example). The pusher 14 interacts with an inclined surface 15 of the action part, with an overall wedge-shaped formation of the action part in this region. In the pressed-down state (see FIG. 2), self-locking between the pusher 14 and the action part 10 results in the area 16.

Figure 2:
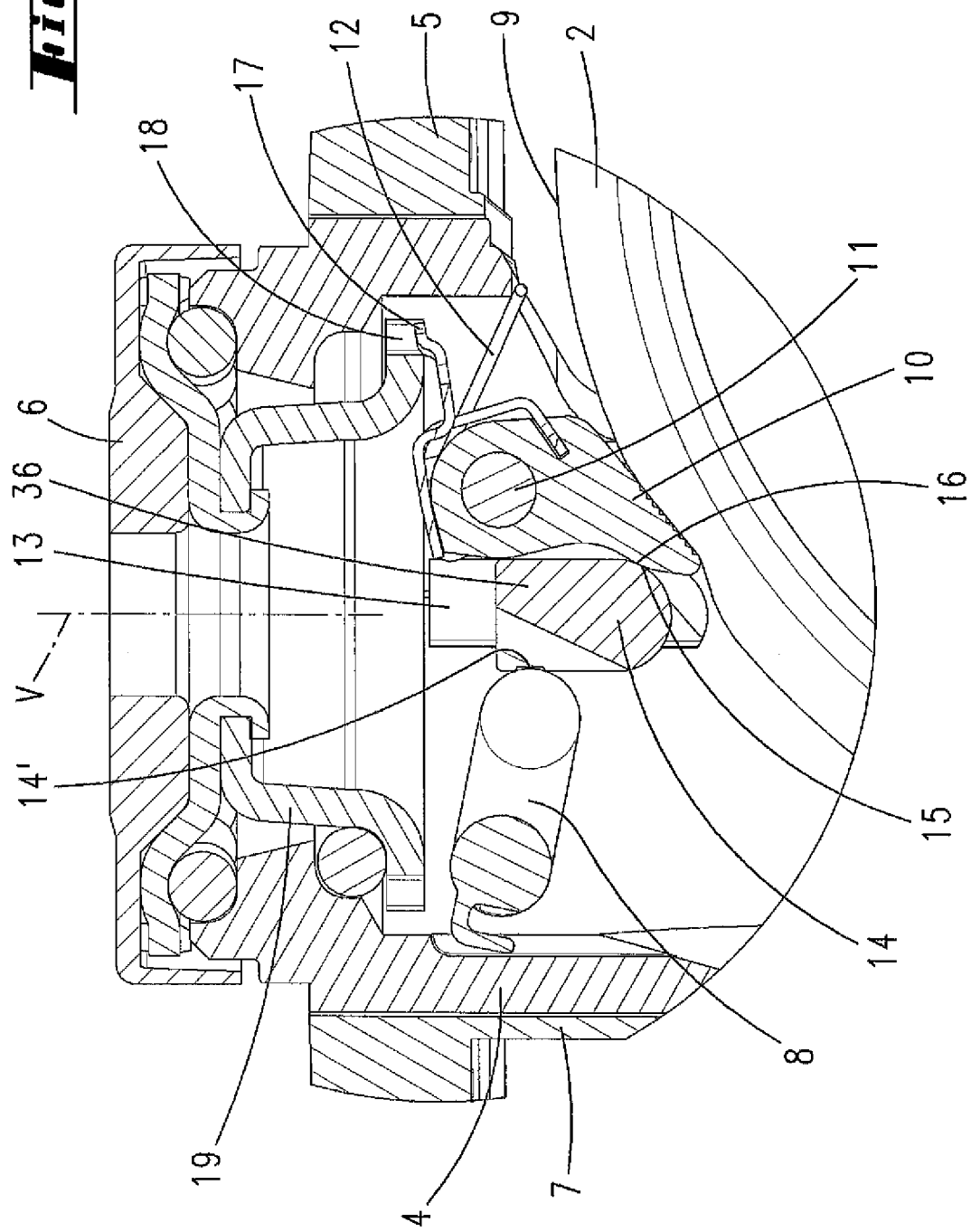
FIG. 2 shows a detail from FIG. 1, in the actuated state.

The pusher 14 also interacts with a part 8 which acts as a counterbearing. This part 8 is cranked, resulting in a free space with respect to the pusher 14 in the region of the crank, through which region the section according to FIG. 2 is also taken. The pusher 14 also has a bevel 36 in this region. The cranked arrangement and the bevel 36 serve to provide an option to pass a screwdriver through, in order to be able to perform installation in the central region of the roller. The part 8 is preferably formed as a hard plastics part, and is mounted in the fork 3 or the vertical portion 4.

The pusher 14 also has a recess 14' which interacts with the part 8 in the braked position according to FIG. 2. Reliable overall self-locking in the braked position is thus achieved.

In addition, the actuating element 5 is not spring-biased, or is spring-biased with only a weak spring force, in its starting position according to FIG. 1. Thus, without further action, the lowered position of the actuating element 5 corresponding to the braking locked position of the wheel according to FIG. 2 is maintained until the braked position is deliberately released.

Figure 4:
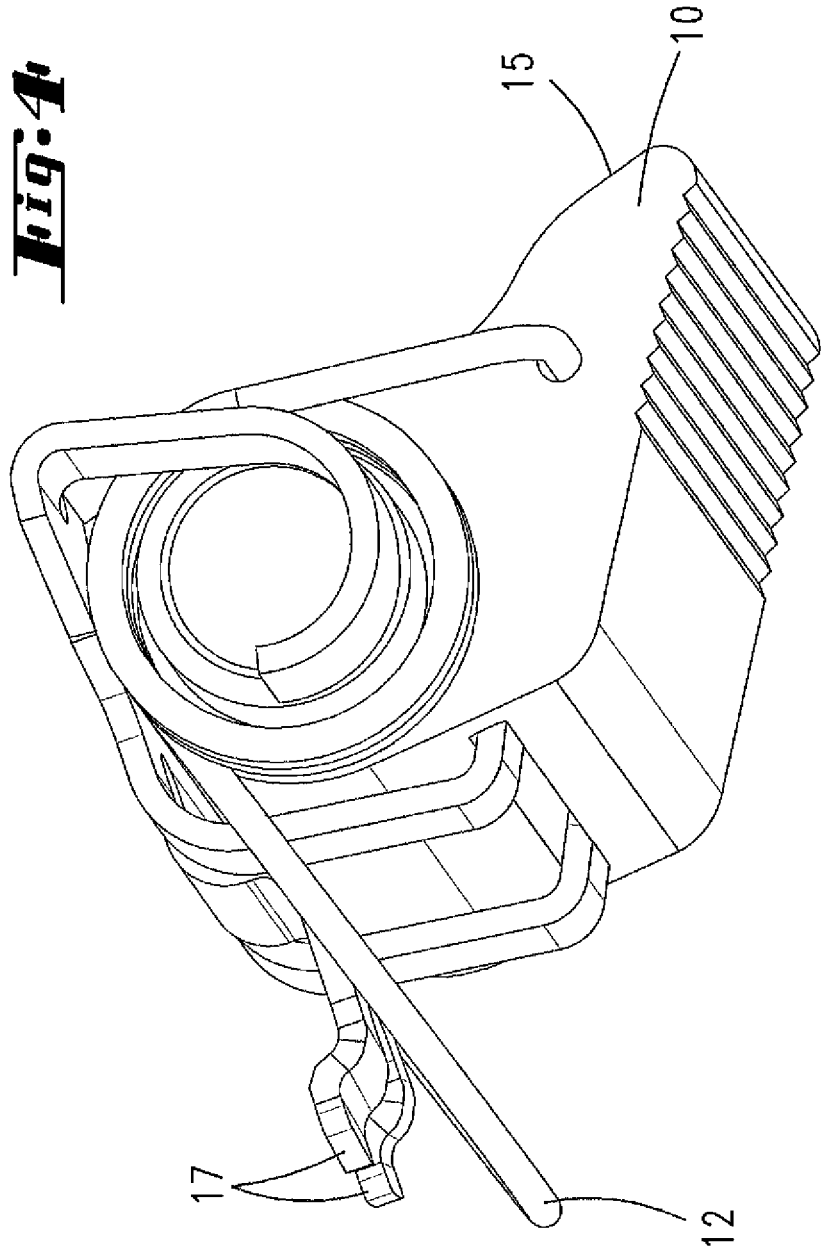
FIG. 4 shows a perspective detail illustration of the action element of the roller according to FIG. 1.

Furthermore, a directional lock 17 is provided as a second locking device on the action part 10, and is able to interact with toothing 18 of the bearing part 19, which is stationary with respect to the securing portion 6 (see FIGS. 2 and 4, for example).

A securing plate, not illustrated in greater detail here, is also connected to the securing portion 6. This securing plate may then be mounted by means of screws to an object such as a piece of furniture or the like. To be able to actuate these screws, through openings 20 are preferably formed in the actuating element 5 (also see FIG. 3).

FIGS. 6 to 14 illustrate another embodiment, also having different indicators. Similar parts are provided with the same reference numerals used with reference to the first embodiment.

The actuating element 5 in the second embodiment is formed in the same way, as an annular disk body, except with a convex surface having a greater radially outward slope than in the first embodiment.

Figure 7:
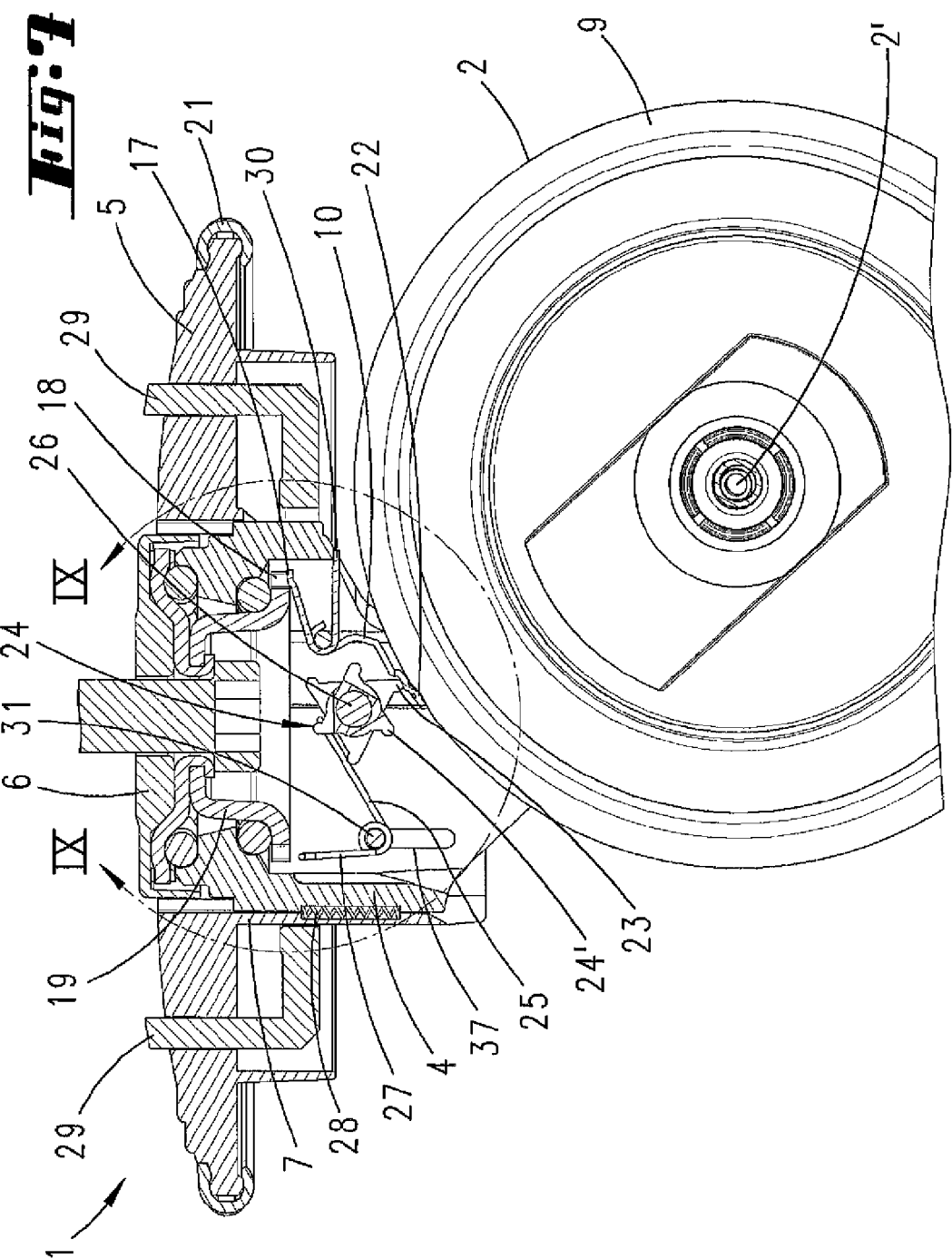
FIG. 7 shows an illustration corresponding to FIG. 6, with the action part in the braked position, additionally with a switching indication.
Figure 8:
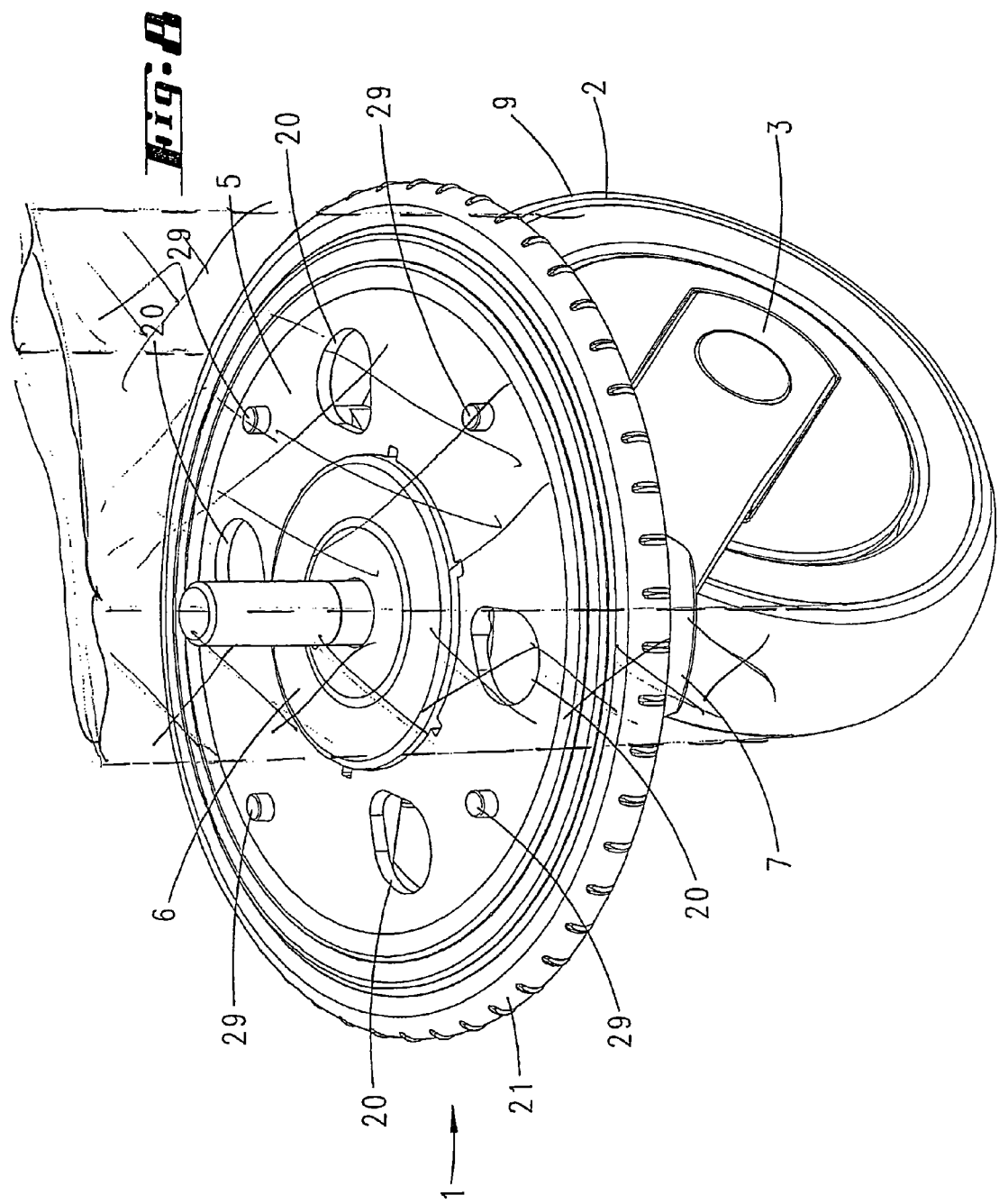
FIG. 8 shows a perspective view from above of the roller according to FIG. 6.

In contrast to the embodiment initially described, in this second embodiment the action element 10 is formed with a detent receptacle 22 on the top side. In the actuated state as illustrated in FIG. 7, an action cam 23 protrudes into this detent receptacle. The action cam 23 is formed on a cam wheel 24, which, in the exemplary embodiment, has three action cams 23 over the periphery. The cam wheel 24 is provided so as to be rotatable about a horizontal pin. In addition, three drive cams 24' which are angularly offset, preferably in the bisectors as illustrated, are formed on the cam wheel. The action cams 23 and the drive cams 24' overlap with an actuating clip 25, which, upon actuation (see the difference between FIG. 6 and FIGS. 7, 9, for example), pulls these respective cams downwardly and thus turns the cam wheel about the pin 26 by one segment in each case. The actuating clip 25 is connected to the actuating part 5 for vertical movement. During the backward movement of the actuating element 5, i.e., after pressing down is completed, the actuating clip 25 runs over the particular cam 23 or, in succession, the particular drive cam 24', without thus initiating rotary motion of the cam wheel 24.

Figure 9:
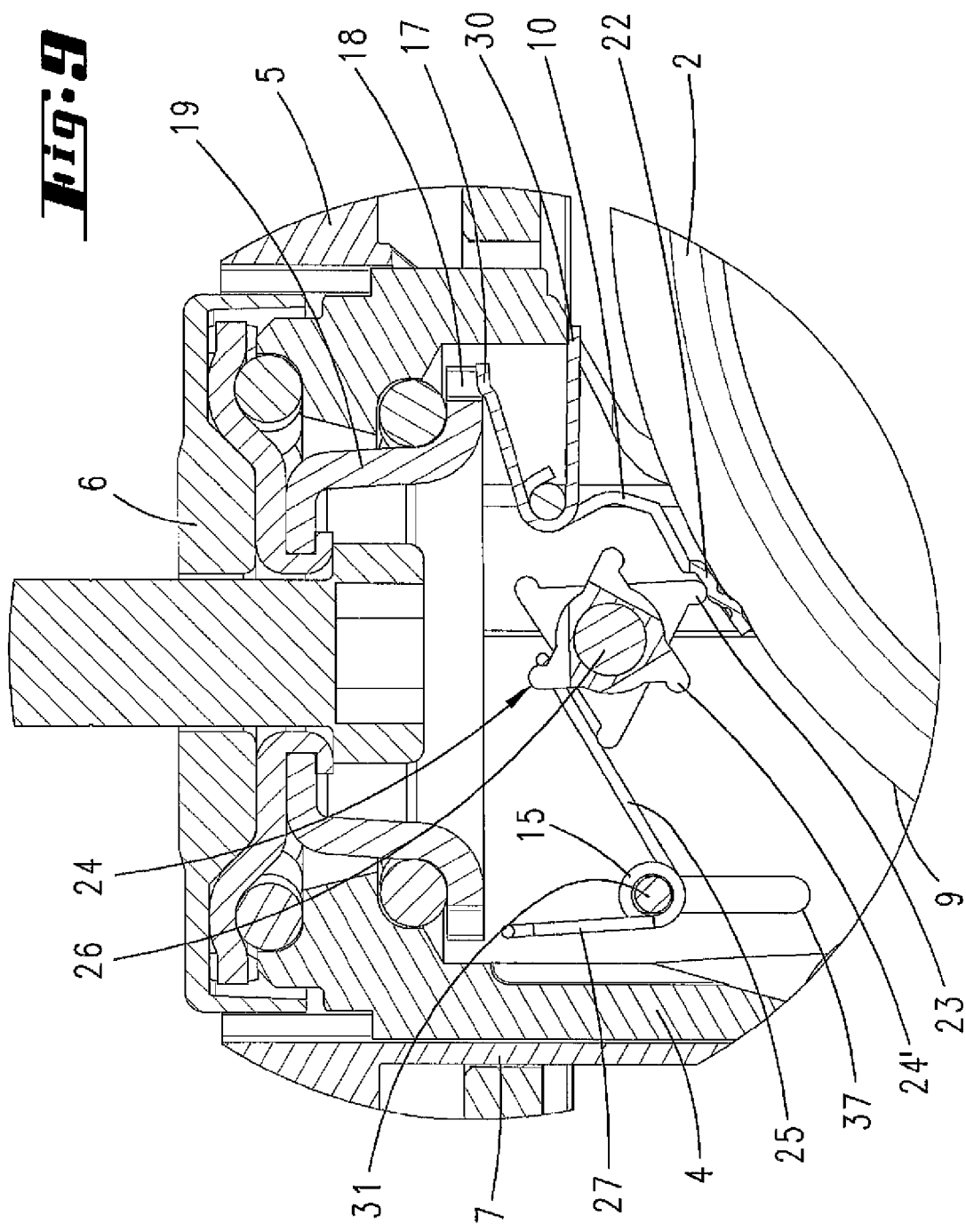
FIG. 9 shows an enlarged illustration of the region of the action element of the roller according to FIG. 7.
Figure 10:
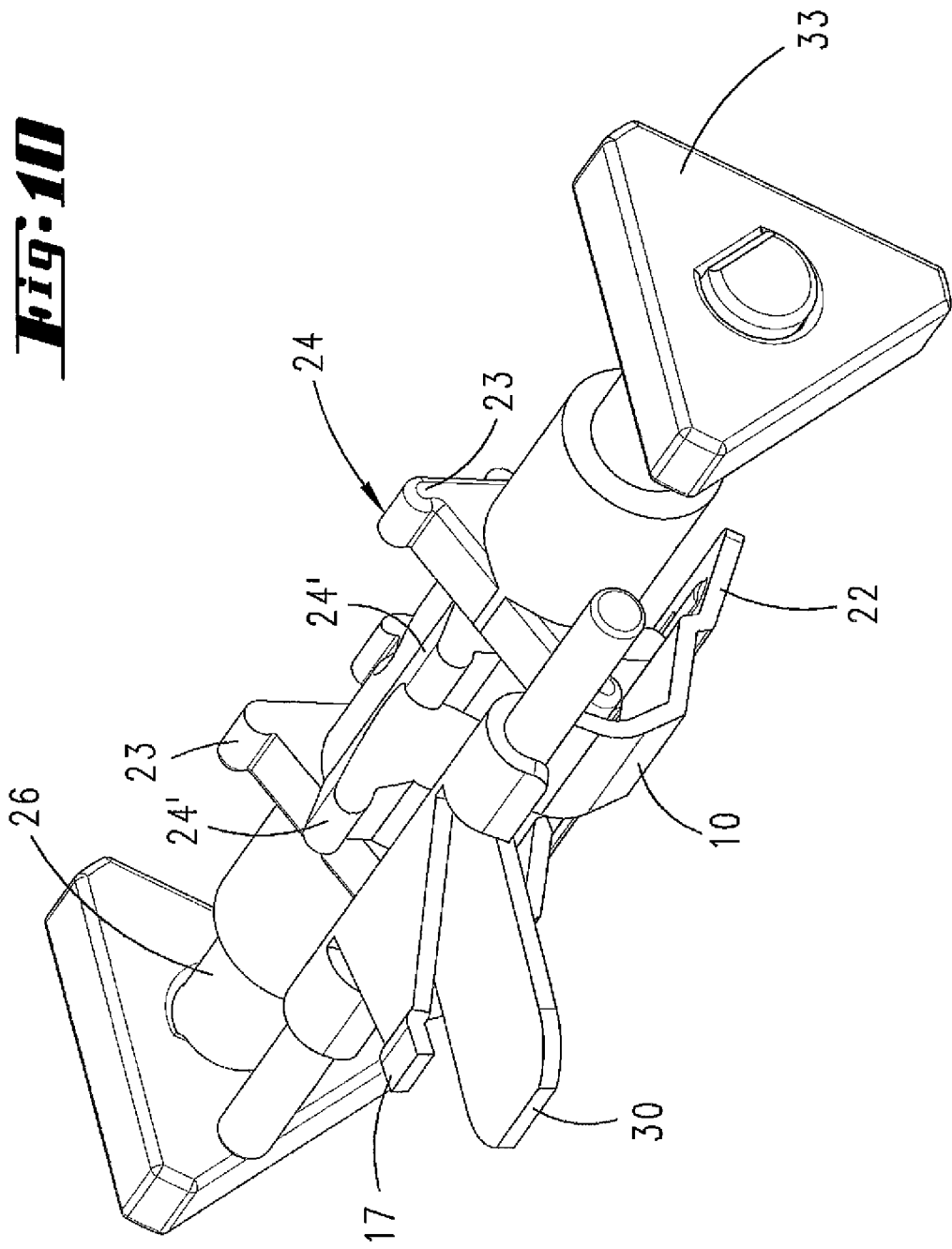
FIG. 10 shows a detail illustration of the pin having the action cam, with, at the end, an actuating element for the indicators.

As is apparent from FIG. 9, for example, the actuating clip 25 is a leg of a substantially V-shaped wire part. The legs of this V-shaped wire part originate from a common coil 15. The coil 15 is guided in an elongated hole 37 by means of a coil pin 31. In the course of pressing down, this results in a decrease in the angle enclosed between the V legs, and correspondingly results in an increase during backwards movement, due to the spring force acting in the actuating clip 25 in the sense of a spreading of the V. The one V leg of the actuating clip supported on the vertical portion 4 is thus a spring clip 27.

Thus, in the second embodiment, the actuating element 5 interacts with the earn wheel 24 in the sense of a stepping mechanism. The cam wheel 24 is moved stepwise without a change in the rotational direction. With each increment, either a drive cam 24' is brought into overlap with the action part 10, in which case the action part 10 is in the released position according to FIG. 6 due to the action of a spring 30, connected to the action part 10, which continuously biases the action part 10 into the unengaged position according to FIG. 6, or an action cam 23 is brought into action, resulting in the actuating position according to FIG. 7 or FIG. 9. In the actuating position according to FIG. 7 or FIG. 9, a directional lock is achieved at the same time by the directional lock 17, also provided in the present exemplary embodiment, which in turn engages with the toothing 18. In particular, the directional lock 17 is formed in one piece with the spring 30.

As a further difference from the first embodiment, in this second embodiment it may be provided that the actuating element 5 in each case is spring-loaded in its starting position by a restoring spring 28.

Figure 11:
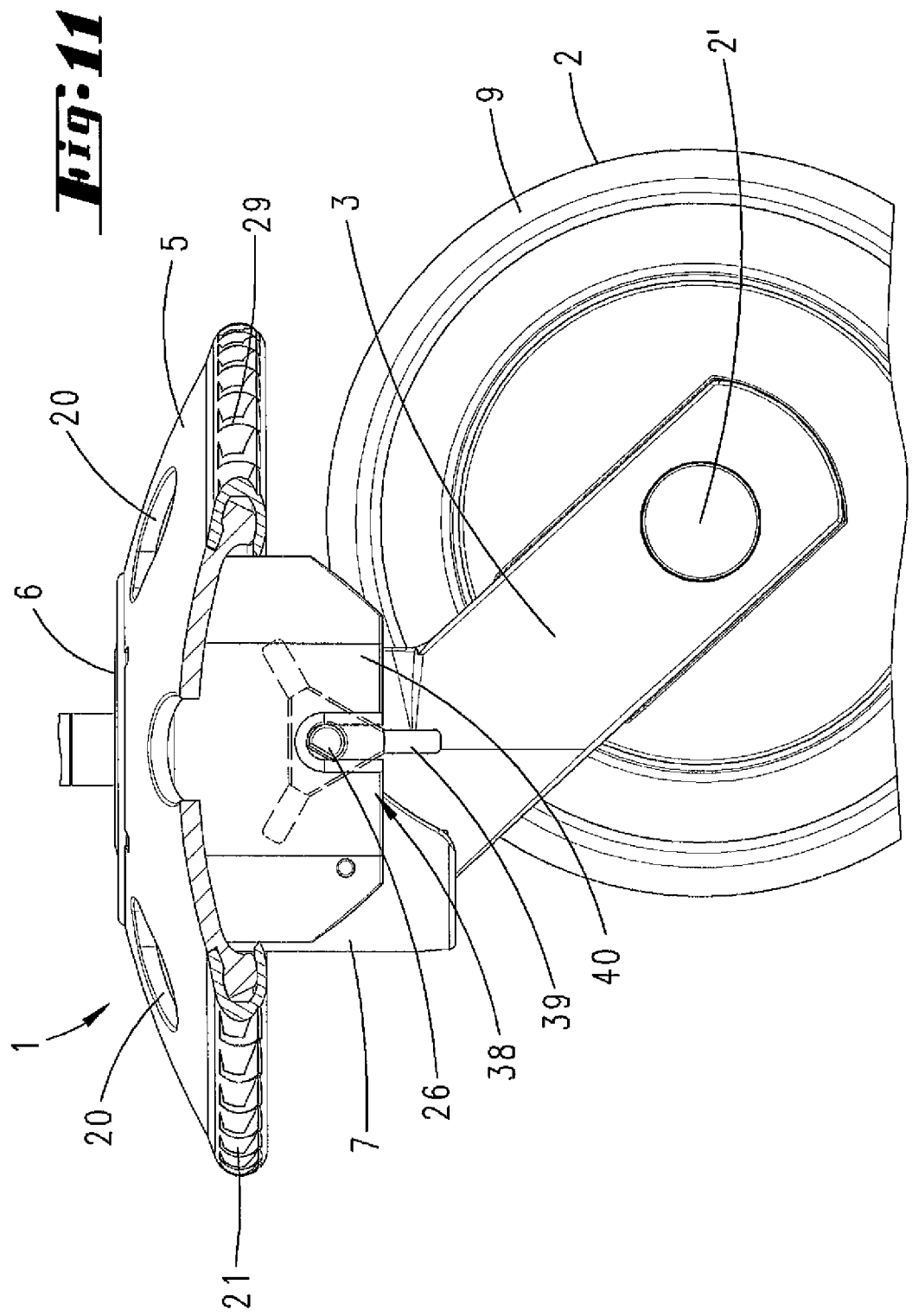
FIG. 11 shows a schematic side view of the roller according to FIG. 8 with an alternative implementation of the indicators, in the actuating position.

It is also preferred in the second embodiment, but also possible in principle in the first embodiment, to provide indicators 29 which indicate a braking lock to the user. A first embodiment of the indicators is depicted in FIGS. 7, 8, 10, 13, and 14. A second embodiment is shown in FIGS. 11 and 12.

In the first embodiment, the indicators 29 are formed as vertically extending end portions of one or two indicator carriers 32. The indicator carriers 32 cooperate with one or two lifting cam disks 33 formed on the pin 26, in the present exemplary embodiment at opposite ends with respect to the pin 26. In the actuated state (see FIG. 14), a lifting cam lifting engagement 34 with the indicator carrier 32 is provided due to the position of the lifting cam disks 33. In contrast, in the nonactuated position according to FIG. 13, the indicator carrier 32 interacts with a flat portion 35 of the cam disk, resulting in the lowered state. It is apparent that an indicator carrier 32 has an offset area in its region of interaction with a lifting cam disk 33. Two indicator carriers 32 which form a total of four indicators are preferably provided.

With regard to the other embodiment of the indicators, a star-shaped part 38 is situated at the end, preferably at both opposite ends, of the pin 26, and in the exemplary embodiment has three pointers 39. As a result of the star-shaped part 38 being covered on the outside by a cover 40, only one pointer 39 is visible in an actuating position. In the exemplary embodiment, the pointer protrudes downwardly past the cover 40. The two other pointers 39 are concealed by the cover 40.

Figure 12:
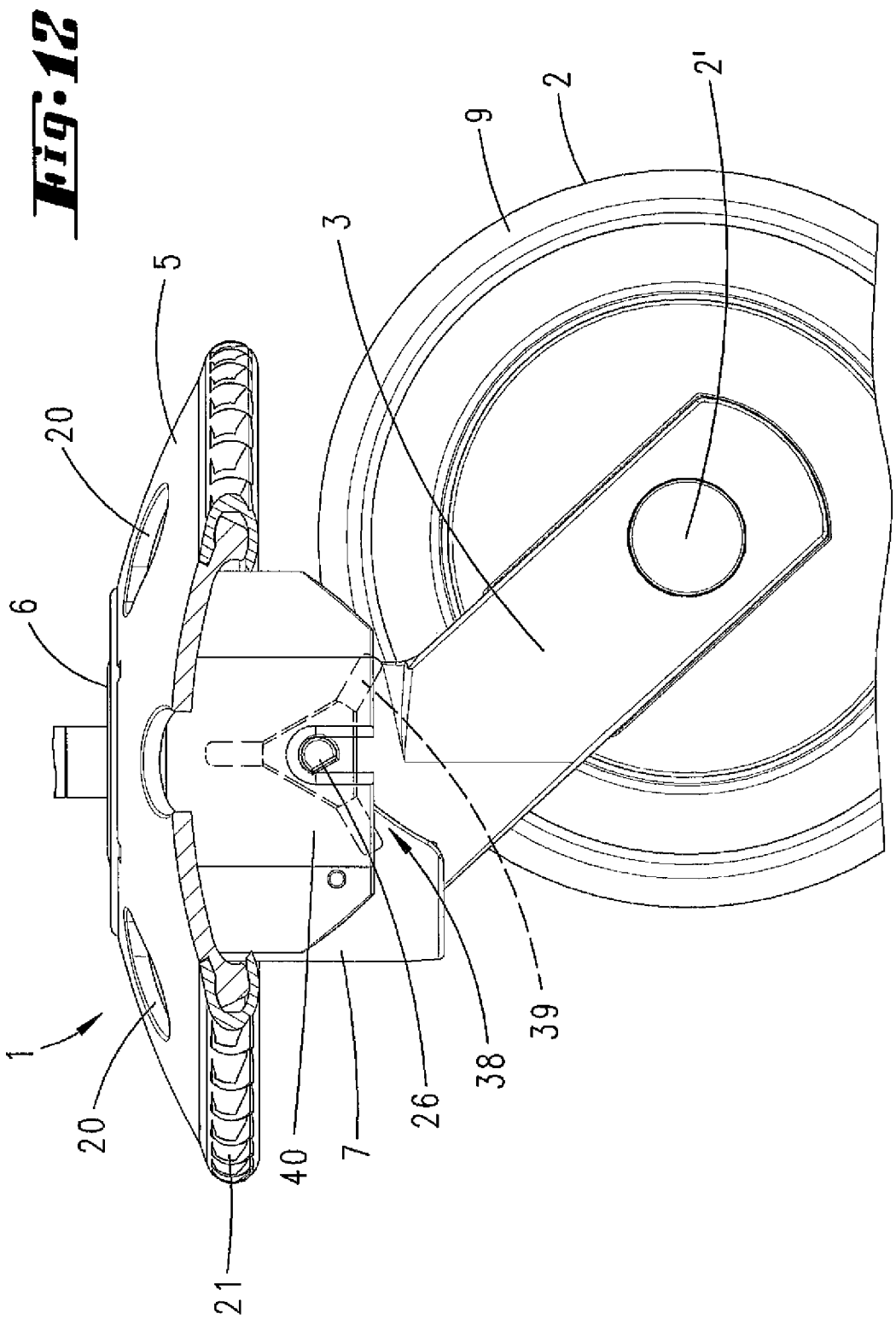
FIG. 12 shows an illustration corresponding to FIG. 11, with the indicators in the released position.

In the released position according to FIG. 12, to all intents and purposes, all pointers 39 are situated behind the cover 40.

An impact protector 21 which radially outwardly surrounds the actuating element 5 is preferably provided in both embodiments. The impact protector 21 is formed as a circumferential portion which is accommodated on the radially outer edge to be freely rotatable on the actuating element 5. If the roller comes into contact with a wall, for example, the impact protector 21 may remain stationary relative to the wall on account of the friction, so that no significant marks may form. The impact protector 21 is preferably made of a comparatively soft plastics material. As a result of this impact protector, the actuating element 5 functions at the same time as a deflector wheel, Due to provided guide elements, for example, the roller may thus be guided in a specific direction at the same time.

All features disclosed are (in themselves) pertinent to the invention. The disclosure content of the associated/accompanying priority documents (copy of the prior application) is also hereby included in full in the disclosure of the application, including for the purpose of incorporating features of these documents in claims of the present application. The subsidiary claims in their optional subordinated formulation characterize independent inventive refinement of the prior art, in particular to undertake divisional applications based on these claims.

LIST OF REFERENCE NUMERALS

1 Roller
2 Wheel 2' Wheel axle
3 Fork
4 Vertical portion
5 Actuating element
6 Securing portion
7 Wall
8 Counterbearing
9 Running surface
10 Action part, locking device
11 Pin
12 Spring part
13 Elongated hole
14 Pusher 14' Recess
15 Coil
16 Area
17 (Directional) locking device
18 Toothing
19 Bearing part
20 Through openings
21 Impact protector
22 Detent receptacle
23 Action cam
24 Drive cam, cam wheel 24' Drive cam
25 Actuating clip
26 Pin
27 Spring clip
28 Restoring spring
29 Indicator
30 Spring
31 Coil axis
32 Indicator carrier
33 Lifting cam disk
34 Lifting cam lifting engagement
35 Flat portion
36 Bevel
37 Elongated hole
38 Star-shaped part
39 Pointer
40 Cover
F Foot (shoe) plan view
V Vertical

The invention claimed is:

1. A roller (1) having a wheel (2), which is accommodated in a housing, and a locking device (10, 17), the locking device (10, 17) being actuated by foot actuation of an actuating element (5) which is arranged so that it extends radially outwardly with respect to a vertical (V) that passes through a securing portion of the roller (1),
wherein an actuating portion of the actuating element (5) extends circumferentially 360° with respect to the vertical; and
wherein the actuating element (5) moves completely vertically as a whole during an actuation;
wherein a vertical portion (4) is a guide for the actuating element (5), and wherein a cylindrical projection (7) of a disk-like body of the actuating element (5) is for guidance on an outer surface of said vertical portion (4); and
wherein there is a complete circumference extension, which is without an interruption; and
wherein an action part (10) which acts on a running surface (9) of the wheel (2) is provided;
wherein the actuating element (5) interacts with the action part (10) via a plurality of action cams (23) which engage in succession the action part (10) and are provided on a rotatably mounted cam wheel (24).

2. The roller according to claim 1, wherein the actuating portion is provided around the circumference of a vertical axis of the roller and the vertical (V) is passing through a securing portion (6) of the roller.

3. The roller according to claim 1, wherein the actuating element (5) has a radially outward impact protector (21) which is freely rotatable with respect to the actuating element (5).

4. The roller according to claim 1, wherein an indicator (29) on the roller which indicates the foot actuation is provided.

5. The roller according to claim 1, wherein the actuating element (5) interacts with the action part (10) by way of a wedge pair.

6. The roller according to claim 5, wherein the wedge pair is self-locking in the actuated state.

7. The roller according to claim 1, wherein the actuating element (5) acts on the action part (10) in two successive actuations with different action cams (23).

* * * * *